US008391827B2

(12) United States Patent
McKenna et al.

(10) Patent No.: US 8,391,827 B2
(45) Date of Patent: *Mar. 5, 2013

(54) SYSTEM FOR CONTROLLING THE OPERATION OF BOTH WIRELESS MULTICASTING SYSTEMS AND ALARM SYSTEMS TO DISTRIBUTE AN ALARM INDICATION TO A DYNAMICALLY CONFIGURED COVERAGE AREA

(75) Inventors: Daniel Bernard McKenna, Vail, CO (US); James Michael Graziano, Hotchkiss, CO (US)

(73) Assignee: Lava Three, LLC, Vail, CO (US)

(*) Notice: Subject to any disclaimer, the term of this patent is extended or adjusted under 35 U.S.C. 154(b) by 946 days.

This patent is subject to a terminal disclaimer.

(21) Appl. No.: 12/165,157

(22) Filed: Jun. 30, 2008

(65) Prior Publication Data

US 2009/0322511 A1   Dec. 31, 2009

(51) Int. Cl.
- *H04M 11/04* (2006.01)
- *H04B 1/38* (2006.01)
- *H04W 4/00* (2009.01)
- *G08B 1/08* (2006.01)

(52) U.S. Cl. .................... 455/404.1; 455/90.1; 455/466; 340/539.22

(58) Field of Classification Search ............... 455/404.1, 455/404.2, 90.1, 466; 340/825.49, 539.1, 340/539.22, 539.26
See application file for complete search history.

(56) References Cited

U.S. PATENT DOCUMENTS

| 6,594,498 | B1 | 7/2003 | McKenna et al. |
| 6,681,115 | B1 | 1/2004 | McKenna et al. |
| 6,741,575 | B1 * | 5/2004 | Zhang et al. .................. 370/329 |
| 7,075,904 | B1 * | 7/2006 | Manish et al. ................ 370/312 |
| 7,076,211 | B2 * | 7/2006 | Donner et al. ............... 455/41.2 |
| 7,301,455 | B2 | 11/2007 | McKenna et al. |
| 7,603,138 | B2 * | 10/2009 | Zhang et al. .............. 455/556.1 |
| 7,653,375 | B2 * | 1/2010 | Kim et al. .................. 455/404.1 |
| 7,848,732 | B2 * | 12/2010 | Thomas ...................... 455/404.1 |
| 2003/0045229 | A1 * | 3/2003 | Snelgrove et al. ........... 455/3.05 |
| 2006/0221963 | A1 * | 10/2006 | Takayanagi et al. .......... 370/390 |
| 2007/0129053 | A1 * | 6/2007 | Phillips et al. ............. 455/404.1 |
| 2008/0186135 | A1 * | 8/2008 | Boling et al. ................ 340/7.51 |
| 2008/0191863 | A1 * | 8/2008 | Boling et al. ................ 340/521 |
| 2008/0261554 | A1 * | 10/2008 | Keller et al. ............... 455/404.1 |
| 2009/0055229 | A1 * | 2/2009 | Lidgren et al. .................... 705/7 |
| 2009/0322523 | A1 * | 12/2009 | Mckenna et al. ............. 340/540 |

* cited by examiner

Primary Examiner — Christopher M Brandt
(74) Attorney, Agent, or Firm — Patton Boggs LLP (57) ABSTRACT

The present Reverse 911 Alarm System implements a central alarm distribution site that is capable of generating an alarm indication to warn individuals of a hazard and propagating the alarm indication to selected ones of a plurality of alarm systems that are located in the service area of the central alarm distribution site to warn individuals of a hazard as well as transmitting the alarm indication to individuals via their wireless subscriber devices by the use of wireless multicasting in the wireless communication network that serves the service area of the central alarm distribution site. The central alarm distribution site creates an integrated Reverse 911 system which dynamically selects the alarm systems and the wireless coverage area to encompass the present extent of the hazard and can provide advanced warning to individuals located in an area that extends beyond the present hazard extent area.

24 Claims, 7 Drawing Sheets

SYSTEM FOR CONTROLLING THE OPERATION OF BOTH WIRELESS MULTICASTING SYSTEMS AND ALARM SYSTEMS TO DISTRIBUTE AN ALARM INDICATION TO A DYNAMICALLY CONFIGURED COVERAGE AREA

CROSS-REFERENCE TO RELATED APPLICATIONS

This Application is related to a U.S. Application titled "System For Distributing An Alarm Indication To A Dynamically Configured Set Of Alarm Systems", and a U.S. Application titled "System For Controlling The Operation Of Wireless Multicasting Systems To Distribute An Alarm Indication To A Dynamically Configured Coverage Area", both filed on the same date as the present application and incorporating the disclosures of each herein.

FIELD OF THE INVENTION

This invention relates to a Reverse 911 alarm system that propagates an alarm indication throughout an impacted area by transmitting the alarm indication via a wireless network multicast transmission to wireless devices which are operable in the impacted area.

BACKGROUND OF THE INVENTION

It is a problem in the field of alarm systems that there are numerous hazards that can be threatening to the occupants of a dwelling or a predetermined locale; and where such a hazard encompasses a widespread area, existing alarm systems are inadequate to properly warn individuals located in the impacted area. The automatic propagation of an alarm indication throughout an area that extends beyond the extent of an alarm system is beyond the capability of existing alarm systems. Furthermore, existing 911 and Reverse 911 systems are not integrally coordinated with the operation of alarm systems and thereby fail to benefit from the alarm indications produced by these systems.

In alarm systems that make use of autonomous alarm devices, the hazard detection sensors incorporated into these devices detect the immediate presence of a predetermined level, concentration, or intensity of the hazard. These autonomous alarm devices are located in fixed locations and respond to the incorporated hazard sensor to automatically generate an alarm indication, such as an audible alarm, to identify the presence of a hazard proximate to the alarm device. However, the audible alarm only alerts individuals who are presently located proximate to the active autonomous alarm device.

Present integrated home protection systems are pre-wired into a dwelling and typically function both as a burglar alarm system and a hazard detection system. These integrated home protection systems use a centralized architecture comprising a master-slave topology to manage a plurality of remotely located sensors and a plurality of remotely located alarm devices that are located in a dwelling. The master-slave topology has all of the remote (slave) sensors reporting alarm events to the central control unit which then responds by audibly alarming ALL remote alarm devices in the system and, if so designed, sending an alarm indication to an external agency, such as the local fire department. However, the integrated home protection systems are unable to respond to communications that are received from a Public Safety Answering Point (PSAP).

Therefore, existing alarm systems fail to propagate an alarm indication beyond the bounds of their installation, except for an automatic notification transmitted to the police/fire department that serves the locale in which the alarm system is installed. These alarm systems also fail to provide the ability to receive communications from external sources in response to an alarm event, or provide output devices that are networked to cover a spatial area that may not be coextensive with the spatial area covered by the alarm devices. Thus, there is a need for an emergency event alarm system that coordinates the operation of multiple alarm systems and that provides an audible indication that a report of the hazard has been received at a Public Safety Answering Point (PSAP) or private security agency or emergency responder organization that serves the dwelling, and that can provide an output in a spatial area that may not be coextensive with the spatial area covered by the alarm devices.

In addition, existing Reverse 911 systems respond to the presence of an emergency situation by initiating an individual one-to-one telephone call, email, or SMS message to every telephone number in the list of contacts. This process is time consuming, since the number of calls can be significant, and also fails to include wireless telephones in the Reverse 911 call list. In addition, in a very large metropolitan area, such as Los Angeles during an earthquake, the sheer volume of one-to-one connections, data or voice, can overload the telecommunications infrastructure. Therefore, existing Reverse 911 systems are slow, prone to miss numbers due to a failure to answer, and do not cover all parties in the impacted area. There is a need for a Reverse 911 system that is more efficient and also covers individuals who use wireless telephones.

BRIEF SUMMARY OF THE INVENTION

The present System For Controlling The Operation Of Both Wireless Multicasting Systems And Alarm Systems To Distribute An Alarm Indication To A Dynamically Configured Coverage Area (termed "Reverse 911 Alarm System" herein) solves the above-described problems by implementing a central alarm distribution site that is capable of generating an alarm indication to warn individuals of a hazard and propagating the alarm indication to selected ones of a plurality of alarm systems that are located in the service area of the central alarm distribution site to warn individuals of a hazard, as well as transmitting the alarm indication to individuals via their wireless subscriber devices by the use of wireless multicasting in the wireless communication network that serves the service area of the central alarm distribution site. The wireless communication network includes the existing cellular communication network and/or wireless-based Local Area Networks (such as proprietary business-based wireless Local Area Networks) which are operational in the coverage area of the hazard. The central alarm distribution site dynamically selects the alarm systems and the wireless coverage area to encompass the present extent of the hazard and can provide advanced warning to individuals located in an area that extends beyond the present hazard extent area. The present Reverse 911 Alarm System thereby integrates the operation of alarm systems and the wireless communication network with the 911 and Reverse 911 services to provide efficient and comprehensive distribution of alarm indications to the individuals who are impacted by an emergency situation.

Alarm systems typically include output devices, each of which generates human sensible alarm indications in response to the receipt of an alarm indication. The output devices can be integrated into the alarm devices or can consist of separate elements. The connecting medium among the output devices could be acoustic, electrically wired, Radio Frequency (RF), optical, power line carrier, or a combination of multiple technologies to enable redundancy and simple installation. The Reverse 911 Alarm System makes use of these output devices by accessing their associated alarm system to propagate an alarm indication to individuals who are located within the coverage area of the associated alarm system.

By making use of the alarm generation capability of existing installed alarm systems and the alarm indication distribution capability of both these alarm systems and the wireless communication network, the Reverse 911 Alarm System can propagate alarm indications to targeted areas and also provide overlapping coverage using different alarm delivery modes for the different wireless networks that are activated. The coverage area of the alarm distribution can be dynamically altered in response to the changing area impacted by the hazard, and different alarm indications can be provided to different coverage areas or classes of individuals to customize the warning and provide accurate updated information to individuals located in the area.

DETAILED DESCRIPTION OF THE INVENTION

There are numerous hazards that can be threatening to the occupants of a dwelling (to include, but not limited to, a factory, office, commercial establishment, public building, or school campus) or those present in a predetermined locale. Autonomous alarm devices are available to detect the presence of a predetermined level, concentration, or intensity of the hazard and automatically generate an alarm indication, such as a loud sound, to alert the individuals in the vicinity of the alarm device of the presence of the hazard.

Alarm systems, such as those described in U.S. Pat. No. 7,301,455, typically include multiple alarm devices and the associated output devices, each of which generates human sensible alarm indications in response to the receipt of an alarm indication. The output devices can be integrated into the alarm devices or can consist of separate elements. The connecting medium among the alarm devices and output devices is a communication medium and could be acoustic, electrically wired, Radio Frequency (RF), optical, power line carrier, or a combination of multiple technologies to enable redundancy and simple installation. The Reverse 911 Alarm System makes use of these output devices by accessing their associated alarm system to propagate an alarm indication from the Reverse 911 Alarm System to individuals who are located within the coverage area of the associated alarm system.

By making use of the alarm generation ability of existing installed alarm systems and the alarm indication distribution capability of the wireless communication network, the present Reverse 911 Alarm System can propagate alarm indications to targeted areas and also provide overlapping coverage using different alarm delivery modes. The coverage area of the alarm distribution can be dynamically altered in response to the changing area impacted by the hazard, and different alarm indications can be provided to different coverage areas or classes of individuals to customize the warning and provide accurate updated information to individuals located in the area.

Public Safety Answering Point

In order to understand the operation of the present Reverse 911 System, the operation of existing 911 emergency services is described herein. Emergency Services access is an important feature of existing telecommunications networks, with the network being capable of not only identifying the subscriber but also their present location to facilitate dispatching emergency services personnel. A universal code, such as 911 in North America and 112 in Europe, is used to access emergency dispatch personnel at predefined sites termed "Public Safety Access Points (PSAPs)". Enhanced 911 (E911) is an extension of this basic service and is defined by the transmission of callback number and geographical location information to the emergency dispatch personnel. The term "geographical location information" is used to refer to information about the physical position of a subscriber in the physical environment as opposed to a communications network address. For example, it comprises a civic address, postal address, street address, latitude and longitude information, or geodetic location information. E911 may be implemented for landline and/or wireless devices. Voice-over-Internet Protocol (VoIP) is a technology that emulates a phone call, but instead of using a circuit based system such as the telephone network, it utilizes packetized data transmission techniques most notably implemented in the Internet.

In order to promptly dispatch emergency service vehicles or other assistance to the correct destination, accurate information about the geographical location of the subscriber is needed. In conventional wire-line switched telephone networks, it is possible to provide the subscriber location information relatively easily because telephone handsets are fixed in particular locations. Static database entries then can be made in a database which is accessible to the emergency services personnel at the Public Safety Access Points (PSAPs) to associate a subscriber's home address and telephone number.

Existing Wire-Line, Wireless, and VoIP Emergency Services Systems

The existing emergency services network is made up of Selective Routers (SR), Automatic Location Identification (ALI) databases (both local and national), and Public Safety Answering Points (PSAPs) with their various Centralized Automatic Message Accounting (CAMA), trunk connections, and various data connections for querying the Automatic Location Identification (ALI) databases. Beyond these network elements are the public safety organizations themselves (Police, Fire, and Ambulance) and the communications networks that support them.

Figure 6:
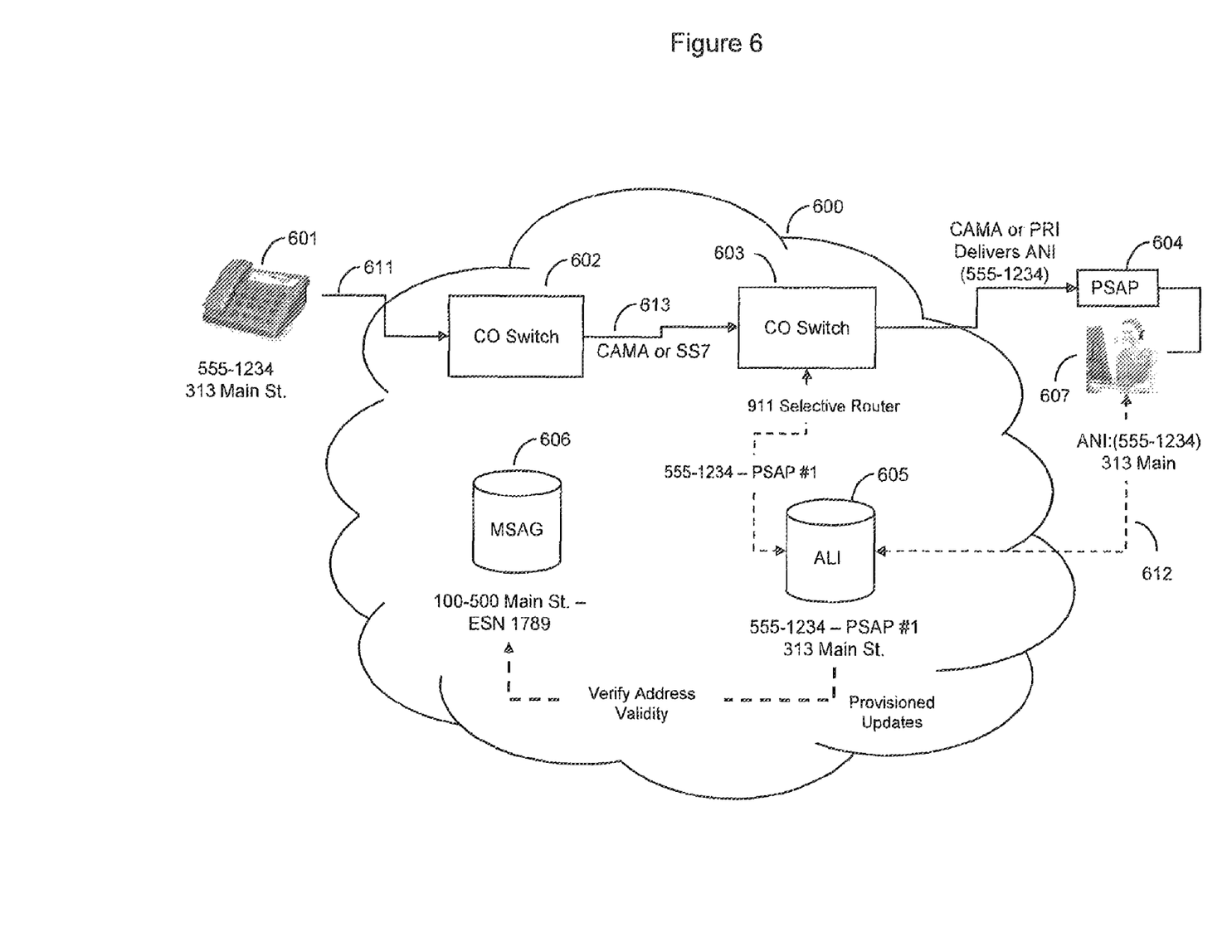
FIG. 6 illustrates, in block diagram form, a typical existing E911 network for wire-line applications.

FIG. 6 illustrates, in block diagram form, a typical existing E911 network for wire-line applications. The location of the subscriber, who is calling the emergency services network, is used for two key purposes. The first is routing of the emergency services call to the correct Public Safety Answering Point (PSAP) 604, and the second is in the delivery of the geographical location information of the subscriber for display to the Public Safety Answering Point (PSAP) operator 607 in order that emergency response units can be dispatched to the correct location. In a wire-line voice network, calling line address information is stored in a database known as an Automatic Location Identification (ALI) database 605. This information in the Automatic Location Identification (ALI) database 605 is updated and verified by synching the Automatic Location Identification (ALI) database 605 with the Master Street Address Guide (MSAG) database 606, which is a system used by the local exchange carrier to associate a telephone number from a subscriber to an Emergency Service Zone (ESZ) which identifies the emergency services agency assigned to respond to an emergency in that locale.

In wire-line voice networks 600, there is an association between the subscriber's phone number (Calling Line Identifier (CLID)), which identifies the telephone line 611 which serves the subscriber's telephone station set 601, and that subscriber's geographical location. This geographical location is generally the home address of the subscriber, which information is maintained by their Local Exchange Carrier (LEC) in the Automatic Location Identification (ALI) database 605. In this case, the Calling Line Identifier (CLID) becomes a ready reference, and the incoming line to the local exchange switch 602 and the local exchange switch 602 provide an explicit indication of the appropriate routing of 911 calls. This permits the local exchange switch 602 to work from a static configuration in terms of selecting the outgoing trunk 613 on which to place the call so it is directed to the correct Selective Router 603. The Selective Router 603, in turn, can use the same static association and Calling Line Identifier (CLID) information stored in the Automatic Location Identification (ALI) 605 to ensure that the call is routed to the correct serving Public Safety Answering Point (PSAP) 604 for the subscriber's address.

On receipt of an emergency call from the subscriber, armed with the subscriber's Calling Line Identifier (CLID), the Public Safety Answering Point (PSAP) 604 is able to query this database via link 612 and receive, in return, the street address (also known as a civic address) information associated with the Calling Line Identifier (CLID). The physical interface over which the Public Safety Answering Point (PSAP) 604 makes this query is variable. It may be an IP-based interface over dial-up or broadband, or it may be made over an X.25 packet interface. Similarly, the Automatic Location Identification (ALI) database 605 may be physically co-located within the Local Exchange Carrier 602 and Selective Router 603, or it may be a remote national Automatic Location Identification (ALI) (not shown) which handles the request directly or in tandem from the local Automatic Location Identification (ALI) 605. The operator at the Public Safety Answering Point (PSAP) 604 gathers information from the calling party and uses this information, along with the automatically delivered information, to deliver an emergency service request to the appropriate emergency services organization.

Figure 7:
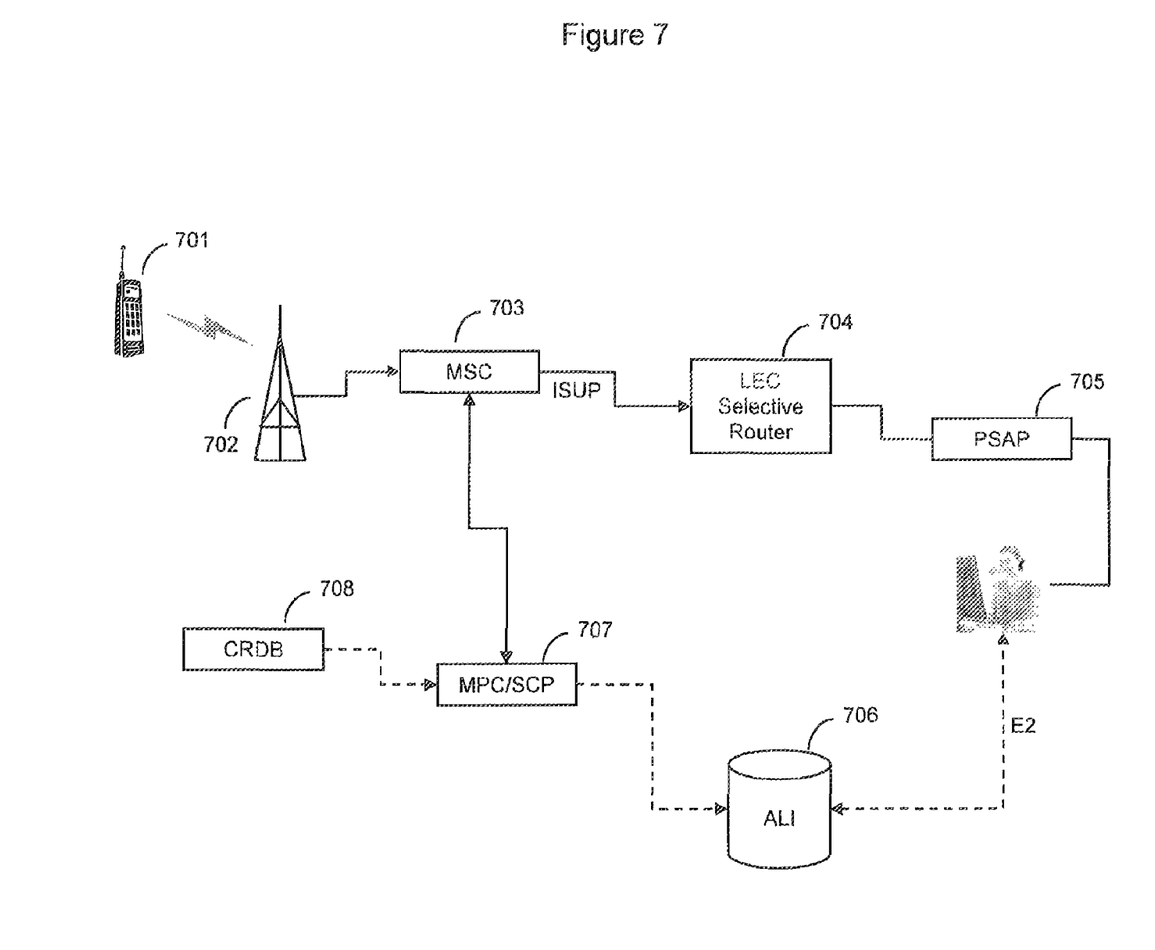
FIG. 7 illustrates, in block diagram form, a typical existing E911 network for wireless applications.

FIG. 7 illustrates, in block diagram form, a typical existing E911 network for wireless applications. In wireless systems, the association between the subscriber's present geographical location and their Calling Line Identifier (CLID) is lost. Being mobile, by definition, a wireless subscriber can be anywhere within the wireless network's area of coverage. Similarly, there is no physical wire-line corresponding to the wireless device 701 which is the source of the call from which to associate a route to the correct destination. In wireless networks, however, there is a physical serving cell 702 from which the call is initiated. The geographic granularity of these cell locations is generally sufficiently fine for the Mobile Switching Center 703 to determine the correct trunk route to a corresponding Selective Router 704. In many cases, this also provides sufficient accuracy for the Selective Router 704 to determine which Public Safety Answering Point (PSAP) 705 the subscriber should be connected with.

It is an internal procedure for the Mobile Switching Center 703 to associate an outgoing trunk route with a serving cell 702. However, some signaling is required for a Mobile Switching Center (MSC) 703 to pass this same information along to the Selective Router 704 so that it can determine the correct Public Safety Answering Point (PSAP) 705. The routing information is passed to the Selective Router 704 in the ISUP (ISDN user part) call setup signaling in one or another newly defined parameter called the Emergency Services Routing Digits (ESRD) or the Emergency Services Routing Key (ESRK). The Selective Router 704 examines the value of the ESRD/ESRK parameter in the call setup signaling and routes the call to the correct Public Safety Answering Point (PSAP) 705 based on this value.

Note that there are circumstances where cell boundaries can span the boundaries of Public Safety Answering Point (PSAP) catchment areas. In this case, the Emergency Services Routing Digits or Emergency Services Routing Key determined from a serving cell 702 may not provide a reliable indication of a route to the correct Public Safety Answering Point (PSAP) 705. Both ANSI-41 (generally TDMA and CDMA) and 3GPP (generally GSM, EDGE, and UMTS) wireless networks have identified functionality to address this. In ANSI-41 networks, a functional element known as a Coordinate Routing Database (CRDB) 708 is defined. The wireless network can consult the Coordinate Routing Database (CRDB) 708 and, based on the geographical location of the subscriber (determined by different positioning technologies such as forward link trilateration, pilot strength measurements, time of arrival measurements, etc.), it returns an appropriate value of the routing parameter. As long as the geographical location is an improvement in accuracy over the cell location, this mitigates the problem of misrouted calls. Similarly, 3GPP networks allow the Mobile Switching Center (MSC) 703 to request a refined routing key value from the Gateway Mobile Location Center (GMLC) based on the geographical location of the subscriber. This location data is available to the Service Control Point 707, which is a standard component of an Intelligent Networks telephone system used to control the service.

Reverse 911 Alarm System Architecture

Figure 1:
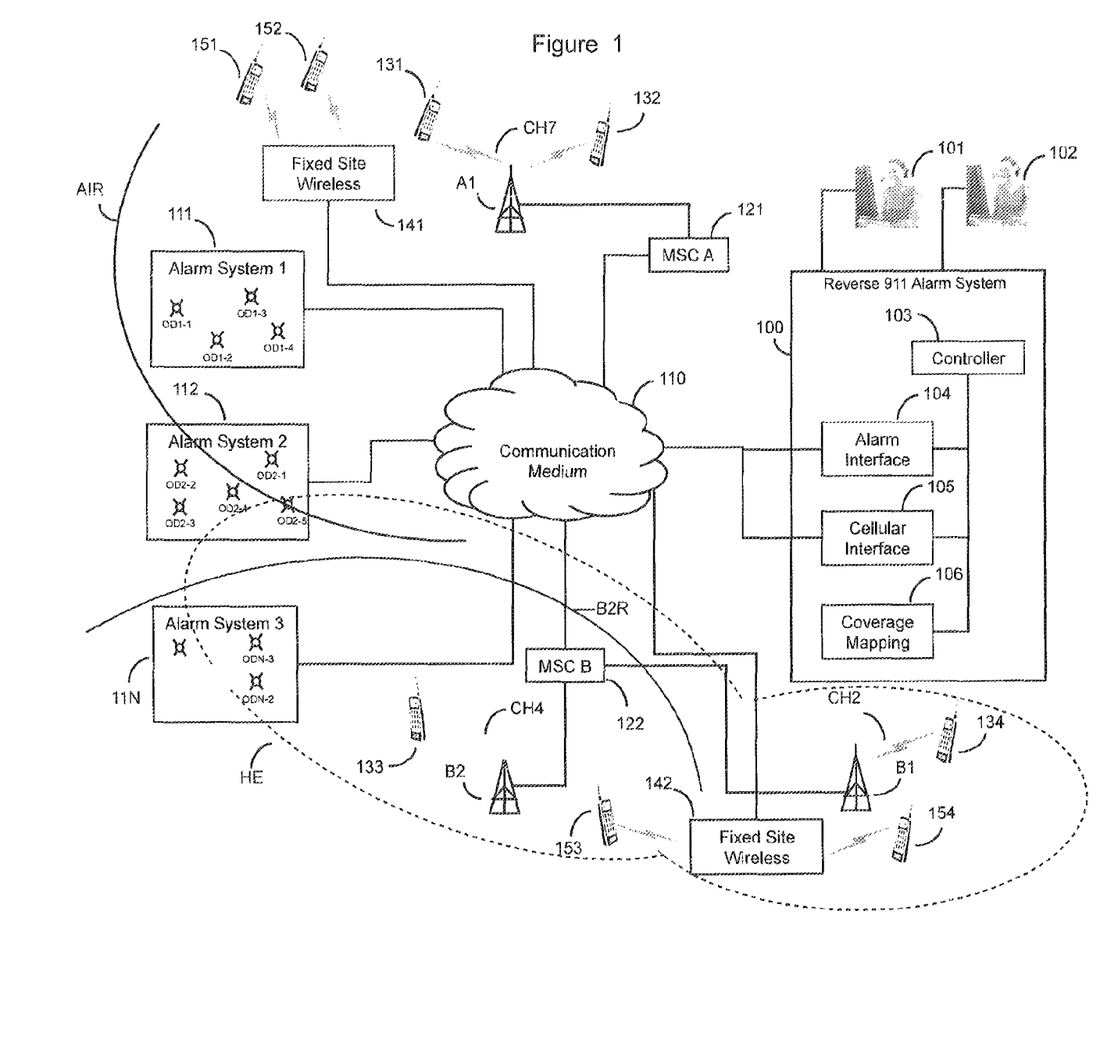
FIG. 1 illustrates, in block diagram form, the configuration of a typical installation of the present Reverse 911 Alarm System.

FIG. 1 illustrates, in block diagram form, the configuration of a typical installation of the present Reverse 911 Alarm System 100, consisting of an Emergency Services site 100, which is connected via communication medium 110 to a plurality of Alarm Systems 111-11N, as well as to a plurality of Mobile Switching Centers 121-122, which are part of the wireless communication network that serves the area around the Emergency Services site 100 and privately owned wireless Local Area Networks 141-142. Each Mobile Switching Center 121-122 includes one or more cell sites, A1, B1-B2, respectively, which operates on the basis of dividing space into a plurality of volumetric sections or cells, and managing communications between wireless subscriber devices 131-134 located in the cells and the associated radio frequency transmitter-receiver pairs located at the cell site A1, B1-B2 for each of these cells. The coverage area of each cell is shown in part (for simplicity) on FIG. 1 as the line AIR being the extent of the cell generated by cell site A1 and B2R being the extent of the cell generated by cell site B2. The full extent of these cells and the cell associated with cell site B1 are not shown to simplify the illustration of FIG. 1. In addition, each wireless Local Area Network 141-142 (such as business LAN systems) serves a plurality of wireless communication devices 151-154.

Each Alarm System 111-11N includes a plurality of Output Devices OD1-1 to OD1-4, OD2-1 to OD2-5, ODN-1 to ODN-3 respectively, each of which functions to generate one or more alarm indications comprising: an audible output of predetermined volume, duration, and pattern, a visual indication, tactile output (for the visually/audibly impaired), and/or external communication to an outside location. The Alarm Systems 111-11N each also include one or more Alarm Devices which function to detect the immediate presence of a hazard, which can be one or more of: fire, heat, carbon monoxide gas, natural gas, smoke, propane, hazardous gas, chemical, bio-hazard, nuclear hazard, intrusion, or other such life-endangering event. The sensor element contained in the Alarm Device typically generates an output electrical or optical signal (in an explosive environment) indicative of the status of the monitored life-endangering event, either safe or unsafe.

The present Reverse 911 Alarm System 100 can be part of a typical Public Safety Answering Point as described above, or it can be some other stand-alone site. The Reverse 911 Alarm System 100 includes a controller 103 for executing the process steps described below as well as to support a plurality of operators 101, 102 who staff this facility. The controller 103 is connected to a coverage mapping database 106 as well as an alarm interface 104 and wireless interface 105. The alarm interface 104 functions to support a bidirectional communications link with the various Alarm Systems 111-11N via the communication medium 110, while the wireless interface 105 functions to support a bidirectional communications link with the Mobile Switching Centers 121-122 and their associated cell sites A1, B1-B2 for initiating multicast transmissions with wireless subscriber devices 131-134 and with wireless Local Area networks 141-142 for initiating multicast transmissions with wireless subscriber devices 151-154 as is described below.

Access Coverage Mapping Database

The access coverage mapping database 106 represents a functionality, operational in the Reverse 911 Alarm System 100, which performs the coverage area mapping. There are two types of alarm situations: an Alarm System originates an alarm which is used by the Reverse 911 Alarm System 100 to transmit alarm indication(s) to individuals via Alarm System(s) and multicast transmissions in the wireless communications network, and the alternative situation where the Reverse 911 Alarm System 100 originates an alarm and transmits alarm indication(s) to individuals via Alarm System(s) and multicast transmissions in the wireless communications network. In both of these situations, the nature and locus of the alarm condition or Hazardous Event HE are correlated with the coverage area of the plurality of Alarm Systems 111-11N, cell sites A1, B1-B2, and wireless Local Area Networks 141-142 as shown on FIG. 1. The identity of individuals who are associated with the Alarm Systems 111-11N and who are equipped with wireless subscriber devices 131-134, 151-154 can also be stored in the access coverage mapping database 106. Thus, the presence of a hazard or the occurrence of a hazardous event is mapped to a set of data which can be used by the operators 101, 102 and the Reverse 911 Alarm System 100 to integrate the operation of selected ones of the Alarm Systems 111-11N, cell sites A1, B1-B2, and wireless Local Area networks 141-142 to present a Reverse 911 alert to individuals in the impacted area as is described below.

Wireless Network Multicast Transmissions

The present Reverse 911 Alarm System 100 makes use of multicast transmissions in the wireless communications network to deliver alarm indications to individuals who are located in the area impacted by the emergency event. A multicast constitutes multi-media content that is concurrently delivered in a single transmission to a plurality of subscribers who are equipped with wireless subscriber devices 131-134, 151-154. A feature of multicast is that multiple subscribers share a single air interface channel, which extends from the radio transmitter of the cell site or the controller of the wireless Local Area Network to their wireless subscriber device and comprises the forward path that carries the multicast, to concurrently receive the multi-media content on the same channel. An exemplary multicast technology is described in detail in U.S. Pat. Nos. 6,594,498 and 6,681,115 for example, and can be used to implement the multicast communications between wireless subscriber devices and the radio frequency transmitter-receiver pairs. The term "wireless" as it is used herein with respect to the cellular communication network denotes a communication system which operates on the basis of dividing space into a plurality of volumetric sections or cells and managing communications between wireless subscriber devices located in the cells and the associated radio frequency transmitter-receiver pairs located at the cell site for each of these cells. The term "multicast channel" represents a communication channel that carries multi-media content (multicast) simultaneously to a plurality of wireless subscriber devices via a forward path and can receive signals from this plurality of wireless subscriber devices via a reverse path of the multicast communication channel.

The basic functionality of the multicast in the wireless communication network comprises an information distribution management functionality that concurrently propagates information to a plurality of wireless subscriber devices. The need for information dissemination is identified: in response to external events, in response to predetermined temporal/ spatial stimuli, as a function of subscriber inquiries or requests, and the like. The wireless communication network, in response to an identified information dissemination event, identifies a plurality of cells and/or wireless Local Area Networks in the wireless communication network as well as available communication channels in each of these cells to carry the information that is to be transmitted to a plurality of wireless subscriber devices extant in the locales served by the selected cells and/or wireless Local Area Networks. The communication channels can be dedicated to multicast services or can be selected from the pool of available communication channels. The subscribers receive the multicasts on a communication channel in their wireless subscriber device that carries the multicast. The subscriber can be alerted to the presence of the multicast in many ways or can activate their wireless subscriber device to retrieve the multicast absent any alert being transmitted to the wireless subscriber device. The multicast received by the subscriber is not subscriber-unique in that the multicast is transmitted to many subscribers with a plurality of subscribers concurrently accessing the multicast on the same communication channel being a typical mode of operation.

The wireless communication network can dynamically configure a multicast coverage area by associating each registered wireless subscriber device with a subscriber profile and present location. Once the multicast coverage group is defined, a plurality of cells in the cellular communication network is selected to form a multicast coverage area group where the spatial extent of a multicast coverage area group can be dynamically established by the presence of wireless subscriber devices in the coverage area of various ones of the cells. In addition, selected ones of the wireless Local Area Networks can be selected to form a Local Area Network multicast coverage area group. Since the wireless Local Area Networks are static in their extent and their served wireless subscriber devices are more limited in their range of movement, the coverage area definition is simple to determine.

New wireless multi-media content delivery architectures in cellular communication networks, such as MediaFLO ("Media ForwardLinkOnly") and DVB-H (Digital Video Broadcast-Handheld), function by using a broadcast architecture in the forward path to produce a pseudo-multicast delivery and concurrently disseminate multi-media content to a plurality of wireless end user devices on a single air interface channel. In these architectures (also termed "multicast" herein), a uni-directional multi-media wireless broadcast network transmits multi-media content to selected authorized wireless end user devices in a time concurrent fashion. For example, cell phones are bi-directional devices, but a pure MediaFLO or DVB-H device is only a unidirectional broadcast receiver. However, many MediaFLO wireless subscriber devices also have a bi-directional cell phone; but the two devices, cell phone and MediaFLO receiver, are not "interconnected" for reverse path transaction communication purposes. The reverse path physical and logical inter-connection with the forward path multi-media content delivery (linking the subscriber-initiated transaction to the forward path information) and associated process management is described in PCT Application No. US07/77409.

Alarm System

Figure 2:
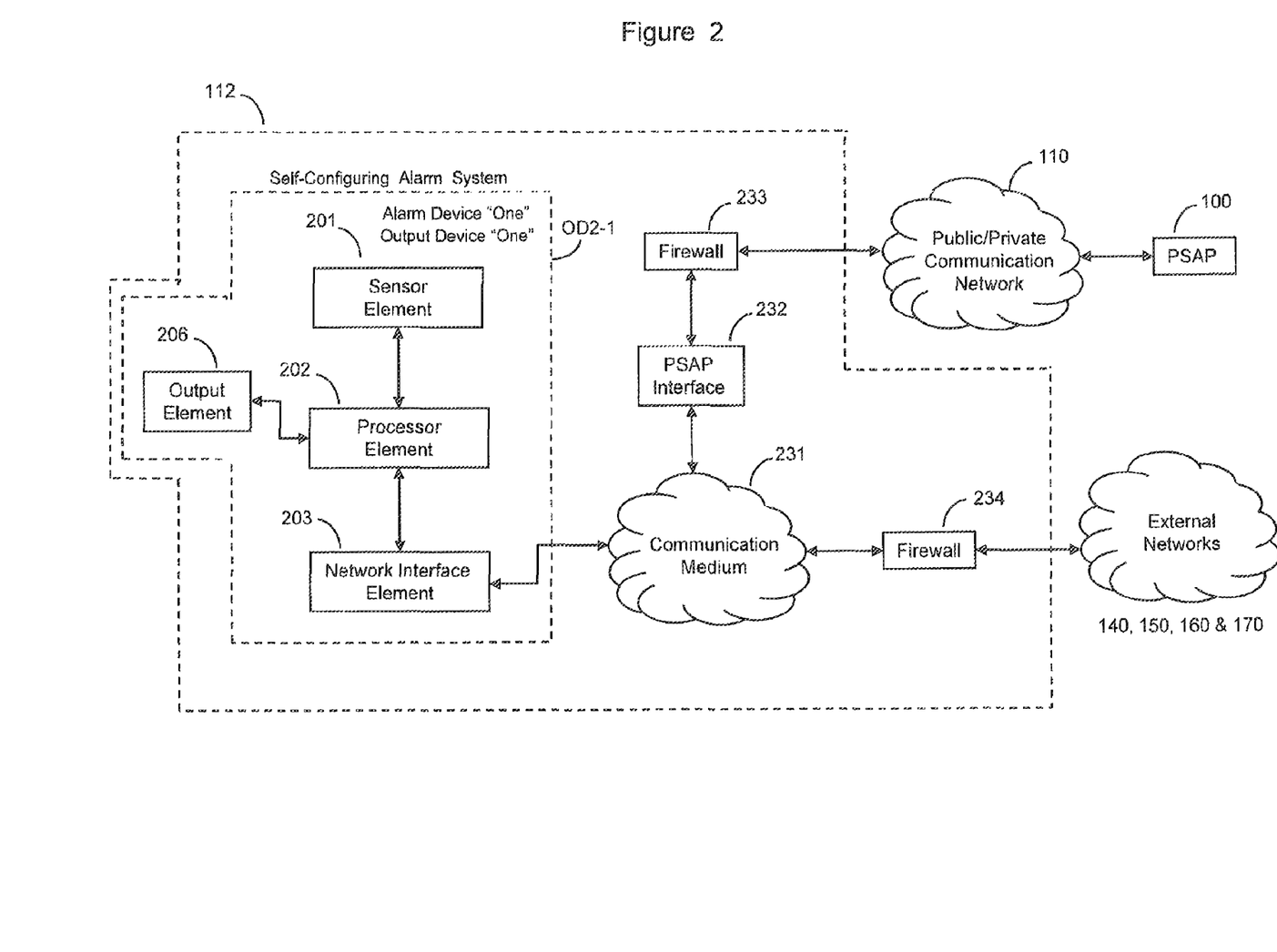
FIG. 2 illustrates, in block diagram form, the architecture of a typical combined alarm/output device.

A U.S. Application titled "Self-Configuring Emergency Event Alarm System With Autonomous Output Devices" filed on the same date as the present application discloses the architecture of an Alarm System that has a network of Alarm Devices as well as a network of Output Devices. As described in this application, either separate alarm and output devices or a combined alarm and output device can be used in the Alarm Network. In order to simplify this description, FIG. 2 illustrates, in block diagram form, the architecture of a typical combined alarm device and output device OD2-1, which consists of sensor element(s) 201, processor element 202, and network interface element 203, as installed in Alarm System 112. The sensor element 201 functions to detect the immediate presence of a hazard, which can be one or more of: fire, heat, carbon monoxide gas, natural gas, smoke, propane, hazardous gas, chemical, bio-hazard, nuclear hazard, intrusion, or other such life-endangering event. The sensor element 201 typically generates an output electrical or optical signal (in an explosive environment) indicative of the status of the monitored life-endangering event, either safe or unsafe. The processor element 202 includes the power source used to power the alarm/output device OD2-1 and a backup (where used), as well as the program controlled device that activates and executes the logic of the alarm/output device OD2-1. This logic monitors the output electrical signal received from sensor element 201, the presence/absence of power, and functions to control the network interface element 203 based on the state of the sensor element 201, as well as the presence of other alarm devices 211-214 as described below.

Network interface element 203 consists of a communication device which functions to establish a communication session with one or more other alarm devices and output devices via a communication medium 231. The communication medium 231 can be any of the known types, including: power line carrier, wireless (radio frequency), acoustic, ultra-sonic, optical, wired, or the like. The preferred communication medium 231 is wire-line, wireless, or a combination thereof. For example, the network interface element 203, when the alarm/output device OD2-1 is installed and initiated, transmits a query over the available communication medium 231 to detect the presence of any other alarm devices that are connected to the communication medium 210M.

In addition, the alarm device 200 is connected via Network Interface 203 and Alarm Device communication medium 231 to PSAP Interface 232. The PSAP Interface 232 communicates to external network Public/Private Communication Network 110 via Firewall 233. The Public/Private Communication Network 110 can take the form of any type of communication architecture and is not limited in its form. Public/Private Communication Network 101 then connects to Public Safety Answering Point (PSAP) 100. The Public Safety Answering Point 100 serves to establish a communication connection via a commercially available communication network 110, such as the Public Switched Telephone Network (PSTN), Internet, Public Switched Data Network (PDSN), or a private network, with a destination external to the Reverse 911 Alarm System 100. This destination can be a Public Safety Answering Point, Law Enforcement, Fire Department, Ambulance, Utility Companies, Private Security Agencies, and the like. A separate external network 205 communication pathway not involving the PSAP occurs via Alarm Device communication medium 110M thru Firewall 234 to External Networks 205.

FIG. 2 also depicts the Output Element 206, which is connected to Processor Element 207, which further connects to Network Interface Element 203. The communication medium 231 serves to interconnect all of the Output Devices via wireless, wired, optical, or other means. Network Interface Element 203 enables external network connections, and communication medium 231 creates two inter-network paths, the first to external networks 205 via Firewall 234 and the second via PSAP Interface 232 thru Firewall 233 to Public/Private Communication Network 110 to PSAP 100. The typical communication flow in this case is an "external to internal" direction where the outside world communicates back to the Alarm/Output Device OD2-1, conveying additional information that is timely for alarm annunciation by the Output Element 206. An example could be a bio-hazard event where emergency responders and other information sources convey additional information back to the Output Element 206. The Output Element 206 functions to generate one or more alarm indications comprising: an audible output of predetermined volume, duration, and pattern, a visual indication, tactile output (for the visually/audibly impaired), and/or external communication to an outside location. In addition, the Output Element 206 can annunciate expert guidance which is received from emergency services personnel at a Public Safety Answering Point 100. It is anticipated that in most cases the annunciating device (output element 206) is co-resident with the alarm element 201. However, nothing herein prevents a stand-alone annunciating output device which may have receive-only networking capability.

In addition, annunciation can, through external network connectivity means, offer expert advice and guidance from emergency responders. This expert advice from an emergency responder could take the form of guidance on how to perform first aid to a burn victim, or it could be how to perform CPR on someone who has smoke inhalation and isn't breathing. If the alarm event is non-machine generated via the autonomous alarm device sensors, that is the alarm is man-initiated, such as in the case of a poisoning, the emergency responders can provide live guidance on how to treat the poisoning victim, both from headquarters as well as from emergency responder vehicles (or via portable emergency personnel communication devices such as radios). This expert assistance could be output in the form of verbal instructions, or it could be displayed on a TV or computer screen, or some other helpful manner.

Figure 3:
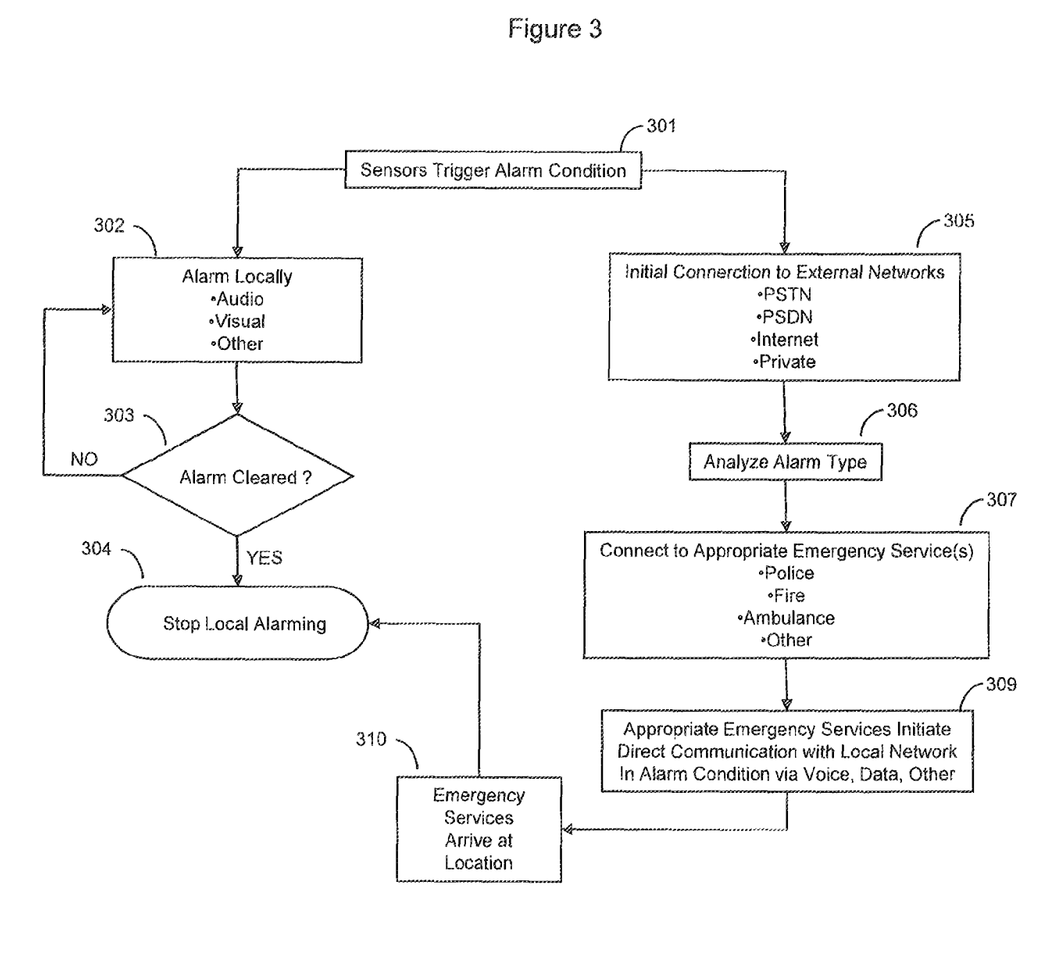
FIG. 3 illustrates, in flow diagram form, the Alarm System's response to a given alarm condition.

FIG. 3 describes the Output Element's response to a given alarm condition. In FIG. 3 at step 301, a sensor element 201 detects a hazard condition and communicates this alarm condition. From step 301, two parallel paths are taken—beginning at steps 302 and 305. At step 302, the local Output Network annunciates the alarm via audio, visual, or other means. Next, at step 303, a check is performed to determine if the alarm condition at 301 has been cleared. If no, the process goes back to step 302 to continue annunciating the alarm condition. If the alarm condition is cleared, the annunciation of the alarm condition is terminated or stopped at step 304.

The second parallel path begins at 305 where the Alarm/Output Device OD2-1 connects to external network(s) via means already described herein. The alarm type then is analyzed at step 306. This analysis could make determinations such as sense of urgency, which units should respond, what types of units should respond, and so on. At step 307, after the alarm analysis is complete at step 306, a communications connection is made to the appropriate Emergency Services responders, for example police, fire, ambulance, and/or other. At step 309, the selected emergency service responders are in direct communication with the local area where the emergency alarm condition initiated. This communication could be data or voice, and it could be mobile or fixed. Step 310 depicts the responders arriving on scene; at this point, and in general, the responder communication link to the local alarming site would be terminated. When the alarm condition is cleared, the alarm condition annunciation would be terminated at step 304. Alternatively, since emergency responders are now on scene, they could make the on-site event management call to terminate the alarm annunciation to enhance response effectiveness.

Alarm And Output Event In The Reverse 911 Alarm System

Figure 4:
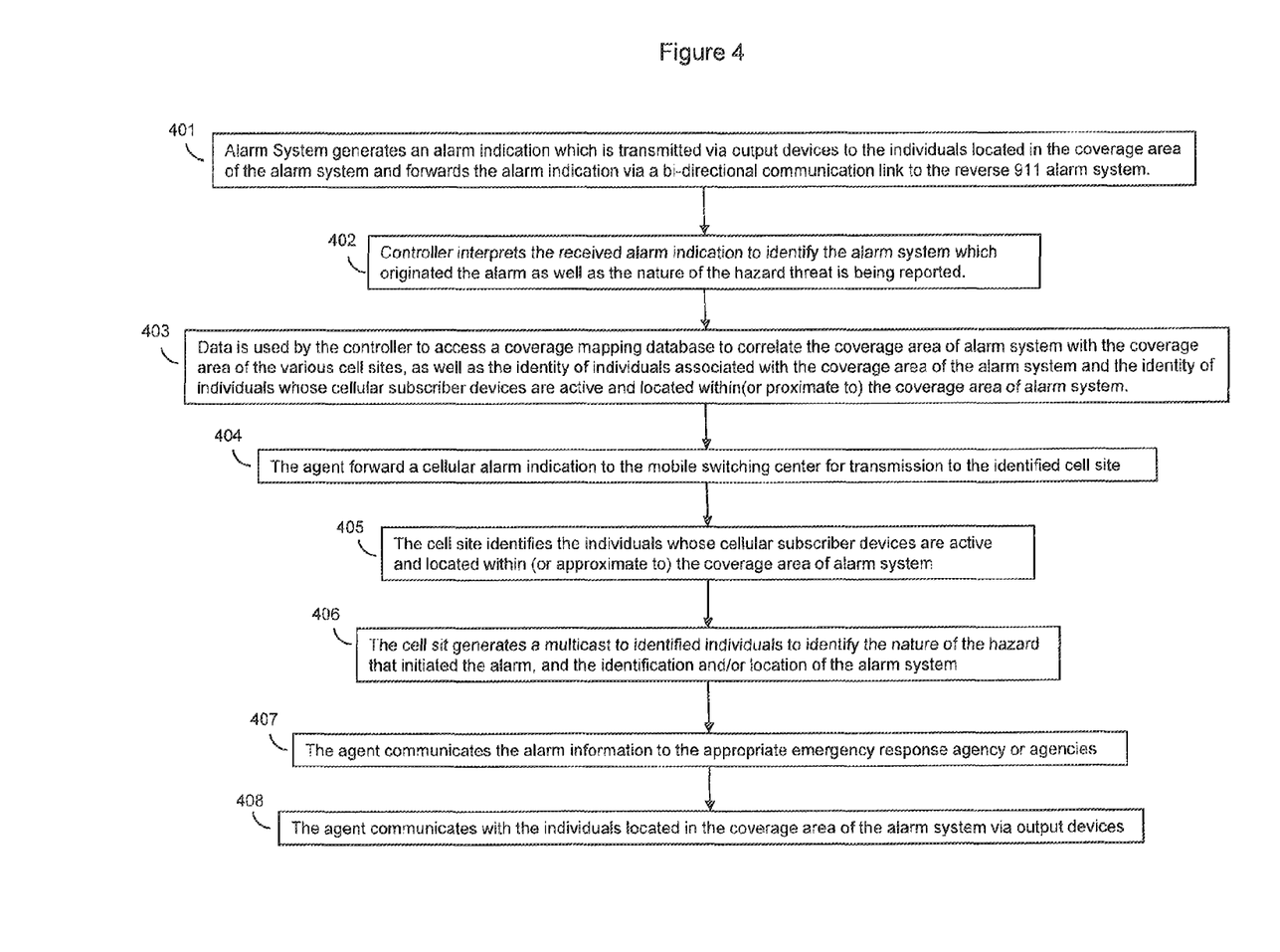
FIGS. 4 and 5 illustrate, in flow diagram form, the operation of the present Reverse 911 Alarm System in generating alarm indications in response to the detection of a hazard condition, and wherein fixed and mobile emergency responders can communicate directly to the alarming site.
Figure 5:
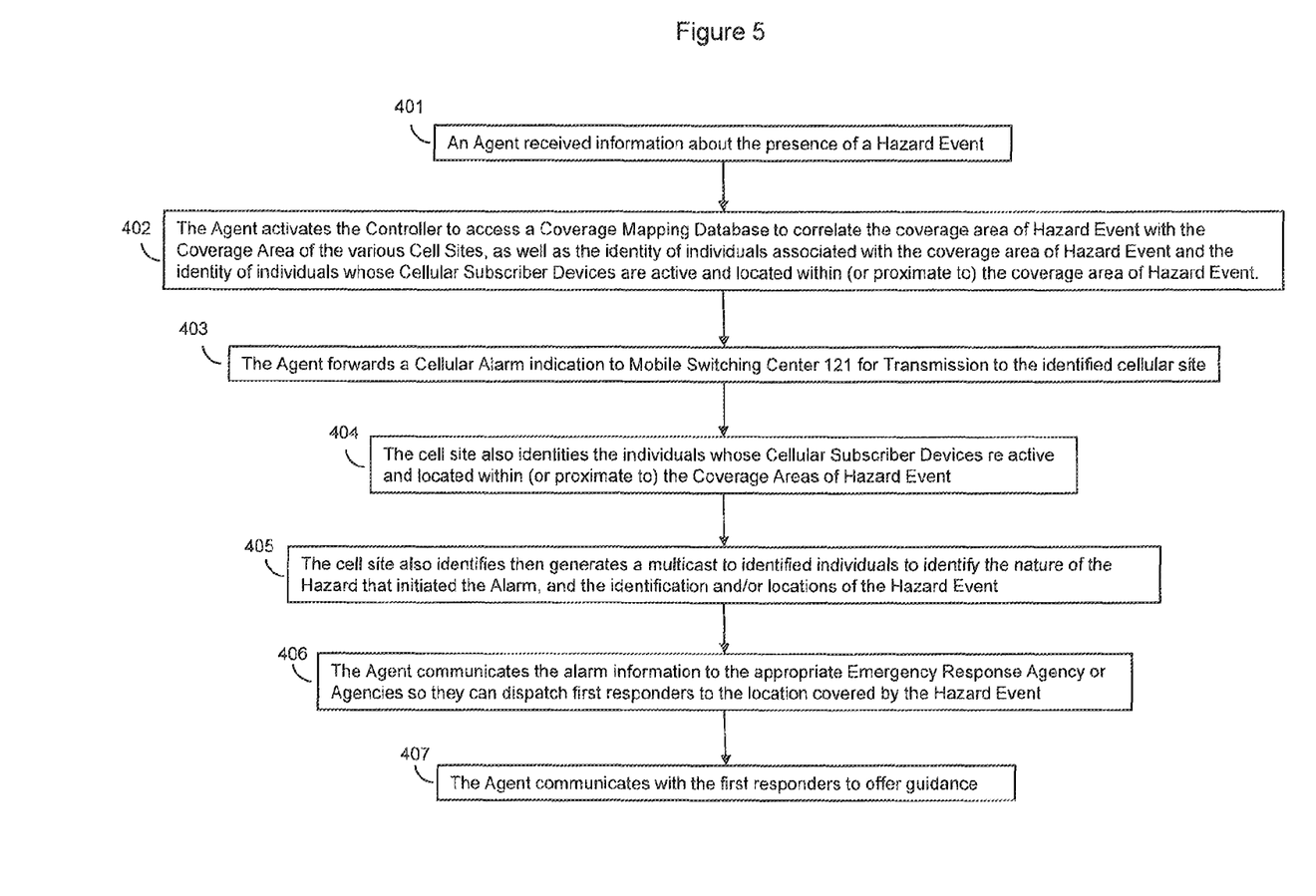

FIGS. 4 and 5 illustrate, in flow diagram form, the operation of the present Reverse 911 Alarm System 100 in response to an alarm indication received from Alarm System 111 and originated in Reverse 911 Alarm System 100, respectively. In the process of FIG. 4, the Alarm System 111 generates an alarm indication which is transmitted via the Output Devices OD1-1 to OD1-4 to the individuals located in the coverage area of the Alarm System 111 and also forwards the alarm indication via a bidirectional communication link through communication medium 110 at step 401 to the Reverse 911 Alarm System 100. This alarm indication is received by alarm interface 104 and forwarded to controller 103. Controller 103 at step 402 interprets the received alarm indication to identify the Alarm System 111 which originated the alarm indication as well as the nature of the hazard that is being reported. This data is forwarded to an available one 101 of the agents 101-102 for interpretation and processing. This data is also used at step 403 by controller 103 to access coverage mapping database 106 to correlate the coverage area of Alarm System 111 with the coverage area AIR of the various cell sites A1 and coverage area of various wireless Local Area networks 141-142, as well as the identity of individuals associated with the coverage area of Alarm System 111 and the identity of individuals whose wireless subscriber devices are active and located within (or proximate to) the coverage area of Alarm System 111.

Agent 101, in coordination with the correlation data produced by controller 103, forwards a wireless alarm indication via wireless interface 105 and communication medium 110 to Mobile Switching Center 121 at step 404 for transmission to the identified cell site A1 and/or to wireless Local Area network 141. This alarm indication provides an identification of the nature of the hazard that initiated the alarm, the identification and/or location of the Alarm System 111, and includes associated data (the identity of individuals associated with the coverage area of Alarm System 111). The cell site A1 and/or wireless Local Area network 141 at step 405 also identifies the individuals whose wireless subscriber devices are active and located within (or proximate to) the coverage area of Alarm System 111. The cell site A1 and/or wireless Local Area Network 141 then generate a multicast at step 406 to these identified individuals to identify the nature of the hazard that initiated the alarm, optionally a map to display the extent of the Hazard Event HE, and the identification and/or location of the Alarm System 111. This alarm indication can be in any multi-media format including voice, data SMS, e-mail, or any other format that is supported.

The Agent 101 at step 407 communicates the alarm information to the appropriate emergency response agency or agencies so they can dispatch first responders to the location covered by the Alarm System 111. In addition, the Agent 101 at step 408 can communicate with the individuals located in the coverage area of the Alarm System 111 via Output Devices OD1-1 to OD1-4 to offer expert advice and guidance from emergency responders. This expert advice from an emergency responder could take the form of guidance on how to perform first aid to a burn victim, or it could be how to perform CPR on someone who has smoke inhalation and isn't breathing. If the alarm event is non-machine generated via the autonomous alarm device sensors, that is the alarm is man-initiated, such as in the case of a poisoning, the emergency responders can provide live guidance on how to treat the poisoning victim, both from headquarters as well as from emergency responder vehicles (or via portable emergency personnel communication devices such as radios). This expert assistance could be output in the form of verbal instructions, or it could be displayed on a TV or computer screen, or some other helpful manner.

In the process of FIG. 5, the Reverse 911 Alarm System 100 originates the alarm indication. This process is initiated at step 501 when an Agent 101 receives information about the presence of a hazard event, which has a coverage area HE as shown on FIG. 1. This Hazard Event can be reported by emergency services personnel, members of the public, etc., and can be a chemical spill, assault on a college campus, or natural phenomena: tornado, hurricane, flooding, wildfire, etc. Thus, the Hazard Event has a coverage area HE that is typically dynamic and impacts different Alarm Systems and areas over time. At step 502, the Agent 101 activates controller 103 to access coverage mapping database 106 to correlate the coverage area of Hazard Event HE with the coverage area AIR of the various cell sites A1, as well as the identity of individuals associated with the coverage area of Hazard Event HE and the identity of individuals whose wireless subscriber devices are active and located within (or proximate to) the coverage area of Hazard Event HE.

Agent 101, in coordination with the correlation data produced by controller 103, forwards a wireless alarm indication via wireless interface 105 and communication medium 110 to Mobile Switching Center 121 at step 503 for transmission to the identified cell site A1 and/or to wireless Local Area network 141. This alarm indication provides an identification of the nature of the hazard that initiated the alarm, the identification and/or location of the Hazard Event HE, and includes associated data (the identity of individuals associated with the coverage area of Hazard Event HE). The cell site A1 and/or wireless Local Area network 141 at step 504 also identifies the individuals whose wireless subscriber devices are active and located within (or proximate to) the coverage area of Hazard Event HE. The cell site A1 and/or wireless Local Area network 141 then generates a multicast at step 505 to these identified individuals to identify the nature of the hazard that initiated the alarm and the identification and/or location of the Hazard Event HE.

The Agent 101 at step 506 communicates the alarm information to the appropriate emergency response agency or agencies so they can dispatch first responders to the location covered by the Hazard Event HE. In addition, the Agent 101 at step 507 can communicate with the first responders to offer guidance.

Hierarchical Alerts

The above-described architecture and operation of the Reverse 911 Alarm System 100 also supports a multiplicity of related alert messages delivered to various identified groups of individuals as well as various coverage areas. In particular, there are certain events which are best managed by delivering different information to different groups of individuals and/or difference coverage areas. An example is a chemical spill which creates a Hazardous Event having an extent HE, as shown on FIG. 1. The individuals who are presently located in this identified area should receive a message which indicates the presence, extent, and nature of the hazardous event. This entails coverage mapping database 106 correlating Alarm Systems 112, 11N and cell sites A1, B2 with the extent of the Hazardous Event HE. The Reverse 911 Alarm System 100 generates messages to be transmitted to Alarm Systems 112, 11N for broadcast via their Output Devices and to Mobile Switching Centers 121, 122 for broadcast via a multicast transmitted from cell sites A1, B2 to the wireless subscriber devices 133, 134 extant in the area of the Hazardous Event HE (as identified by the Mobile Switching Centers 121, 122). The data which defines the presence, extent, and nature of the Hazardous Event HE are transmitted to Mobile Switching Centers 121, 122 so they can identify, via the GPS data received from the wireless subscriber devices 131-134 operating in the coverage areas of cell sites A1, B2, which wireless subscriber devices 133, 134 are located in the area impacted by the Hazardous Event HE. In response to this data, the Mobile Switching Center 122 activates cell site B1 to generate a multicast for transmission to the identified wireless subscriber devices 133, 134 to alert these individuals of the Hazardous Event HE.

In addition, the Reverse 911 Alarm System 100 can generate another set of messages for transmission to individuals who are outside of, but proximate to, the impacted area of the Hazardous Event HE. This area is dependent on the predicted spread of the Hazardous Event HE and would likely include Alarm System 111 as well as any wireless subscriber devices (such as 131, 132) identified by the Mobile Switching Centers 121, 122 as being located within the coverage area of cell sites A1, B1 but outside of the impacted area of the Hazardous Event HE. These messages can be transmitted as noted above. The sequence of messages and coverage areas of the Reverse 911 alerts can be time varying as the Hazardous Event HE impact area changes and/or the nature of the event changes in intensity.

Another example of a set of hierarchical message delivery with a coverage overlap that is somewhat orthogonal to the prior example is the case of a college campus. The campus can be equipped with multiple networks of alarm devices and output devices, as well as different classes of individuals to whom the alert is transmitted. For example, in the case of an assault on a female student in a coverage area, such as Alarm System 111, the alarm message is transmitted to all individuals located in the coverage area of Alarm System 111 via the Output Devices OD1-1 to OD1-5 operational in Alarm System 111. In addition, a first message warning females of the potential imminent danger, directed to all female individuals (students, staff, faculty, members of the public, etc.) is multicast via the cell site A1. In addition, a complementary message noting that the recipients of the message should be alert to an intruder (since they are likely not in imminent danger) directed to all male individuals (students, staff, faculty, members of the public, etc.) is multicast via the cell site A1. A third message can be multicast in all coverage areas of the region to all campus police, local police department employees, etc. in the form of an immediate reaction required bulletin. Other messages can be propagated in like manner to the area surrounding the coverage area of Alarm System 111, whether or not on the campus grounds, warning individuals of the event that has occurred. An additional multicast channel can be used to broadcast "breaking news" to all individuals who have indicated in their subscription package that they want to receive such news bulletins. Thus, a plurality of distinct messages, each directed to a separate class of individuals and/or coverage area, can be generated and delivered to the individuals who are targeted to receive this information. The coverage areas, as well as the classes of recipients, can change over time in response to changes in the present situation that caused an alarm to be generated. Thus, Reverse 911 Alarm System 100 can make use of a multiplicity of communication systems in a manner to reach individuals previously not within the scope of conventional Reverse 911 systems.

Summary

The present Reverse 911 Alarm System implements a central alarm distribution site that is capable of generating an alarm indication to warn individuals of a hazard and propagating the alarm indication to selected ones of a plurality of alarm systems that are located in the service area of the central alarm distribution site to warn individuals of a hazard as well as transmitting the alarm indication to individuals via their wireless subscriber devices by the use of wireless multicasting in the wireless communication network that serves the service area of the central alarm distribution site.

What is claimed as new and desired to be protected by Letters Patent of the United States is:

1. A Reverse 911 Alarm System for transmitting an alarm indication to individuals served by at least one of a cellular communication network and an alarm system to warn individuals of a hazard condition, comprising:

an alarm controller means, responsive to receipt of alarm data indicative of the presence of a hazard condition, for generating at least one alarm indication;

a hazard coverage area determination means for dynamically defining a coverage area indicative of a geographical extent of the hazard condition, including a list of cell sites that provide cellular service to the coverage area indicative of the geographical extent of the hazard condition;

a hazard alarm distribution control means for transmitting the alarm indication to cell site controllers which are associated with the cell sites in the list of cell sites having a communication coverage corresponding to the geographical extent of said hazard condition;

a cellular communication device identification means, operational in each of the cell site controllers which are associated with the cell sites in the list of cell sites, for identifying all cellular communication devices which are active in the cell site;

a cellular multicast means, operational in the cell site controllers which are associated with the cell sites in the list of cell sites, for concurrently transmitting the alarm indications via a single multicast to a plurality of the identified cellular communication devices to generate human sensible output to warn individuals who use said cellular communication devices of the hazard condition; and an alarm system alarm indication communication means, communicatively connected to a plurality of alarm systems, for transmitting at least one of said alarm indications via selected ones of said plurality of alarm systems to an associated plurality of output devices served by the alarm system to generate human sensible output to warn said individuals who are located in a coverage area of said output devices of said hazard condition.

2. The Reverse 911 Alarm System of claim 1, further comprising:

an alarm system selection means for dynamically selecting at least one of said plurality of alarm systems, located in said geographical area for distribution of said at least one alarm indication, for receipt of said at least one alarm indication.

3. The Reverse 911 Alarm System of claim 2, further comprising:

a destination specific alarm means for generating a plurality of alarm indications, each specific in content to at least one of: mode of transmission, target set of individuals to receive said alarm indication, relationship among target sets of individuals to receive said alarm indication, and coverage area targeted;

a hierarchical coverage means for distributing said plurality of alarm indications in a time-ordered and coverage area specific manner; and an alarm system control means for transmitting said alarm indications to said selected ones of cellular communication networks and alarm systems to activate said plurality of cellular communication devices and said plurality of output devices.

4. The Reverse 911 Alarm System of claim 1, further comprising:

an alarm indication coverage area determination means for dynamically defining a geographical area for distribution of said alarm indication, wherein said geographical area for distribution of said alarm indication is not coextensive with said geographical extent of said hazard condition.

5. The Reverse 911 Alarm System of claim 1, further comprising:

a destination specific alarm means for generating a plurality of alarm indications, each specific in content to at least one of: mode of transmission, target set of individuals to receive said alarm indication, relationship among target sets of individuals to receive said alarm indication, and coverage area targeted;

a hierarchical coverage means for distributing said plurality of alarm indications in a time-ordered and coverage area specific manner; and an alarm system control means for transmitting said alarm indications to said selected cellular communication networks to activate said plurality of cellular communication devices and said plurality of output devices.

6. The Reverse 911 Alarm System of claim 1 wherein said alarm controller means is responsive to receipt from at least one of said alarm systems of alarm data indicative of the presence of a hazard condition for generating at least one alarm indication.

7. The Reverse 911 Alarm System of claim 1, further comprising:

an operator interface means for enabling a human operator to input alarm data indicative of the presence of a hazard condition; and wherein said alarm controller means is responsive to receipt of said human operator input alarm data indicative of the presence of a hazard condition for generating at least one alarm indication.

8. The Reverse 911 Alarm System of claim 1, further comprising:

at least one unidirectional forward broadcast path that extends from said cell site to said plurality of cellular communication devices for transmitting said alarm indications to said individuals who are equipped with said cellular communication devices.

9. The Reverse 911 Alarm System of claim 8, further comprising:

a reverse path from said cellular communication devices to said cell site for transmitting feedback data from said cellular communication devices to said Reverse 911 Alarm System.

10. The Reverse 911 Alarm System of claim 1 wherein said at least one cellular communication network comprises at least one fixed site wireless network of the class of wireless networks which include WiMax and WiFi that serve a plurality of wireless subscriber devices which are extant in a coverage area of said fixed site wireless network, said Reverse 911 Alarm System further comprises:

a message control means for transmitting said alarm indication to fixed site wireless network controllers which are associated with said at least one fixed site wireless network to initiate transmission of said alarm indication to said plurality of wireless subscriber devices.

11. The Reverse 911 Alarm System of claim 10, further comprising:

at least one unidirectional forward broadcast path that extends from said fixed site wireless network to said plurality of wireless subscriber devices for transmitting said alarm indications to individuals who are equipped with said wireless subscriber devices.

12. The Reverse 911 Alarm System of claim 11, further comprising:

a reverse path from said wireless subscriber devices to said fixed site wireless network for transmitting feedback data from wireless subscriber devices to said Reverse 911 Alarm System.

13. A method of operating a Reverse 911 Alarm System for transmitting an alarm indication to individuals served by at least one of a cellular communication network and an alarm system to warn individuals of a hazard condition, comprising:

generating, in response to receipt of alarm data indicative of the presence of a hazard condition, at least one alarm indication;

dynamically defining a coverage area indicative of a geographical extent of the hazard condition, including a list of cell sites that provide cellular service to the coverage area indicative of the geographical extent of the hazard condition;

transmitting the alarm indication to cell site controllers which are associated with the cell sites in the list of cell sites having a communication coverage corresponding to the geographical extent of said hazard condition;

identifying, in each of the cell site controllers which are associated with the cell sites in the list of cell sites, all cellular communication devices which are active in the cell site; and concurrently transmitting, from an alarm indication communication apparatus which is operational in the cell site controllers which are associated with the cell sites in the list of cell sites, the alarm indications via a single multicast to a plurality of the identified cellular communication devices to generate human sensible output to warn individuals who use said cellular communication devices of the hazard condition; and transmitting, from an alarm indication communication apparatus which is communicatively connected to said plurality of alarm systems, at least one of said alarm indications via selected ones of said plurality of alarm systems to an associated plurality of output devices served by the alarm system to generate human sensible output to warn said individuals who are located in a coverage area of said output devices of said hazard condition.

14. The method of operating a Reverse 911 Alarm System of claim 13, further comprising:

dynamically selecting at least one of said plurality of alarm systems, located in said geographical area for distribution of said at least one alarm indication, for receipt of said at least one alarm indication.

15. The method of operating a Reverse 911 Alarm System of claim 14, further comprising:

generating a plurality of alarm indications, each specific in content to at least one of:

mode of transmission, target set of individuals to receive said alarm indication, relationship among target sets of individuals to receive said alarm indication, and coverage area targeted;

hierarchically distributing said plurality of alarm indications in a time-ordered and coverage area specific manner; and transmitting said alarm indications to said selected ones of cellular communication networks and alarm systems to activate said plurality of cellular communication devices and said plurality of output devices.

16. The method of operating a Reverse 911 Alarm System of claim 13, further comprising:

dynamically defining a geographical area for distribution of said alarm indication, wherein said geographical area for distribution of said alarm indication is not coextensive with said geographical extent of said hazard condition.

17. The method of operating a Reverse 911 Alarm System of claim 13, further comprising:

generating a plurality of alarm indications, each specific in content to at least one of: mode of transmission, target set of individuals to receive said alarm indication, relationship among target sets of individuals to receive said alarm indication, and coverage area targeted;

hierarchically distributing said plurality of alarm indications in a time-ordered and coverage area specific manner; and transmitting said alarm indications to said selected ones of cellular communication networks and alarm systems to activate said plurality of cellular communication devices and said plurality of output devices.

18. The method of operating a Reverse 911 Alarm System of claim 13 wherein said step of generating is responsive to receipt from at least one of said alarm systems of alarm data indicative of the presence of a hazard condition for generating at least one alarm indication.

19. The method of operating a Reverse 911 Alarm System of claim 13, further comprising:

enabling a human operator to input alarm data indicative of the presence of a hazard condition; and wherein said step of generating is responsive to receipt of said human operator input alarm data indicative of the presence of a hazard condition for generating at least one alarm indication.

20. The method of operating a Reverse 911 Alarm System of claim 13, further comprising:

transmitting, over at least one unidirectional forward broadcast path that extends from said cell site to said plurality of cellular communication devices, said alarm indications to said individuals who are equipped with said cellular communication devices.

21. The method of operating a Reverse 911 Alarm System of claim 20, further comprising:

transmitting, over a reverse path from said cellular communication devices to said cell site, feedback data from said cellular communication devices to said Reverse 911 Alarm System.

22. The method of operating a Reverse 911 Alarm System of claim 13 wherein said at least one cellular communication network comprises at least one fixed site wireless network of the class of wireless networks which include WiMax and WiFi that serve a plurality of wireless subscriber devices which are extant in a coverage area of said fixed site wireless network, said method of operating a Reverse 911 Alarm System further comprises:

transmitting said alarm indication to fixed site wireless network controllers which are associated with said at least one fixed site wireless network to initiate transmission of said alarm indication to said plurality of wireless subscriber devices.

23. The method of operating a Reverse 911 Alarm System of claim 22, further comprising:

transmitting, over at least one unidirectional forward broadcast path that extends from said fixed site wireless network to said plurality of wireless subscriber devices, said alarm indications to individuals who are equipped with said wireless subscriber devices.

24. The method of operating a Reverse 911 Alarm System of claim 23, further comprising:

transmitting, over a reverse path from said wireless subscriber devices to said fixed site wireless network, feedback data from wireless subscriber devices to said Reverse 911 Alarm System.

* * * * *